United States Patent [19]

Kozuka

[11] Patent Number: 5,152,358
[45] Date of Patent: Oct. 6, 1992

[54] VEHICLE STEERING APPARATUS

[75] Inventor: Hajime Kozuka, Tokyo, Japan

[73] Assignee: Mitsubishi Jidosha Kogyo Kabushiki Kaisha, Tokyo, Japan

[21] Appl. No.: 570,601

[22] Filed: Aug. 21, 1990

[30] Foreign Application Priority Data

| Aug. 24, 1989 | [JP] | Japan | 1-98767[U] |
| Oct. 20, 1989 | [JP] | Japan | 1-122761[U] |
| Oct. 20, 1989 | [JP] | Japan | 1-122762[U] |
| Oct. 20, 1989 | [JP] | Japan | 1-122763[U] |
| Oct. 20, 1989 | [JP] | Japan | 1-122764[U] |
| Nov. 1, 1989 | [JP] | Japan | 1-127122[U] |
| Nov. 1, 1989 | [JP] | Japan | 1-127123[U] |

[51] Int. Cl.$^5$ .................. B60R 21/22; B62D 1/04
[52] U.S. Cl. .................. 180/78; 280/731; 200/61.54; 74/498; 439/15
[58] Field of Search .................. 180/78, 90; 73/493; 74/492, 498; 200/61.54; 439/164, 165, 15, 34; 280/731, 737

[56] References Cited

U.S. PATENT DOCUMENTS

| 1,592,714 | 7/1926 | Biederman et al. | 74/498 |
| 1,795,566 | 3/1931 | Maccomb | 180/78 |
| 3,543,874 | 12/1970 | Nevett | 74/498 |
| 3,744,817 | 7/1973 | Ousset | 280/731 |
| 4,277,984 | 7/1981 | Numazawa | 74/492 |
| 4,368,454 | 1/1983 | Pilatzki | 180/78 |
| 4,383,148 | 5/1983 | Arima | 439/15 |
| 4,572,313 | 2/1986 | Ono et al. | 180/78 |
| 4,797,538 | 1/1989 | Schick | 180/78 |

FOREIGN PATENT DOCUMENTS

| 8907647 | 9/1989 | Fed. Rep. of Germany . |
| 2098804 | 3/1972 | France . |
| 2144300 | 2/1973 | France . |
| 2209345 | 6/1974 | France . |
| 609624 | 9/1960 | Italy .................. 280/731 |
| 53-105234 | 8/1978 | Japan . |
| 60-69752 | 5/1985 | Japan . |

Primary Examiner—Karin L. Tyson

[57] ABSTRACT

A vehicle steering apparatus includes a steering wheel which has an annular boss portion with an axis and is rotatably supported on a vehicle body side member, a steering shaft, and a non-rotatable member provided in the steering wheel, which is coupled to the vehicle body side member by shafts. The rotation of the steering wheel is transmitted to the steering shaft by a mechanism including a pinion portion having an axis, formed at an end portion of the steering shaft on a side of the steering wheel, and a ring gear portion having an axis, formed on an inner surface of the boss portion and meshed with the pinion portion, the axis of the ring gear portion being eccentric with the axis of the pinion portion and concentric with the axis of the boss portion. The coupling member extends through a gap between the ring gear portion and the pinion portion.

30 Claims, 9 Drawing Sheets

VEHICLE STEERING APPARATUS

BACKGROUND OF THE INVENTION

1. Field of the Invention

The present invention relates to a vehicle steering apparatus for holding a pad portion disposed at a substantially central portion of a steering wheel in a non-rotatable state when the steering wheel is rotated.

2. Description of the Related Art

One arrangement of a vehicle steering apparatus with a non-rotatable pad portion is shown in FIG. 1 of Published Unexamined Japanese Utility Model Application No. 53-105234. In this prior art, a pad portion disposed at a substantially central portion of a steering wheel is provided to a stationary shaft fixed to a vehicle body side. The steering wheel is rotatably mounted on the stationary shaft. In addition, a steering shaft is coupled to a steering gear mechanism to be separated from the steering wheel. Furthermore, a gear provided on a boss portion of the steering wheel is externally meshed with a gear provided on the steering shaft side. Thus, a two-shaft external gear meshing type structure for transmitting rotation of the steering wheel to the steering gear mechanism via a meshing mechanism of these gears upon rotation of the steering wheel is adopted.

Another prior art example is a vehicle steering apparatus shown in FIG. 2 of Published Unexamined Japanese Utility Model Application No. 53-105234 is known. In this prior art, a pad portion disposed at a substantially central portion of a steering wheel is attached to a stationary shaft fixed to a vehicle body side. Furthermore, the steering wheel is rotatably supported on the end portion of a hollow steering shaft disposed on the outer surface of the stationary shaft. The outer surface of the steering shaft is rotatably supported by a steering column, so that rotation of the steering wheel is directly transmitted to the steering shaft. However, in the former two-shaft external gear meshing type mechanism, the gear provided on the boss portion of the steering wheel and the gear arranged o the steering wheel shaft are externally meshed, and rotation of the steering wheel is transmitted to the steering gear mechanism via the meshing mechanism of these gears. Therefore, the rotational direction of the steering wheel is opposite to that of the sheering shaft, and a meshing reversal mechanism must be arranged in the meshing mechanism of the gear of the steering wheel shaft and the gear of the steering shaft. For this reason, the structure of a transmission mechanism for transmitting the rotation of the steering wheel to the steering gear mechanism side is complicated, resulting in an increase in cost. Furthermore, since the gear of the steering wheel is externally meshed with the gear of the steering shaft, the pressure angle of teeth is large. Thus, when a simple spur gear is used, noise such as meshing noise is easily generated.

In the latter structure, a fixing portion of the stationary shaft to the vehicle body must be arranged in front of the steering gear mechanism at the front end of the steering shaft. Therefore, the structure for arranging the fixing portion is complicated. Furthermore, when switches are arranged on the pad portion at substantially the central portion of the steering wheel, harness for these switches is guided outside the passenger compartment through the interior of the stationary shaft. Thus, the protection and assembly of wirings of the harnesses around the stationary shaft are cumbersome.

SUMMARY OF THE INVENTION

The object of the invention is to provide a vehicle steering apparatus comprising a steering wheel which has an annular boss portion with an axis and is rotataby supported on a vehicle body side member, a steering shaft, rotation transmission means for transmitting rotation of said steering wheel to said steering shaft, a non-rotatable member provided in said steering wheel, and coupling means for coupling said non-rotatable member and said vehicle body side member, said rotation transmission means comprising pinion means having an axis, formed at an end portion of said steering shaft on a side of said steering wheel, and ring gear means having an axis, formed on an inner surface of said boss portion and meshed with said pinion means, the axis of said ring gear means being eccentric with the axis of said pinion means and concentric with the axis of said boss portion, said coupling means extending through a gap between said ring gear means and said pinion means.

According to the present invention, the pinion means of the steering shaft is internally meshed with the ring gear means of the steering wheel in an eccentric state. For this reason, the gap is formed between the ring gear means and the pinion means, and the coupling member inserted in the gap can couple the non-rotatable member and the vehicle body side member. Therefore, the non-rotatable member which is non-rotatable upon rotation of the steering wheel can be disposed by a relatively simple arrangement.

More specifically, with the above arrangement, the rotational direction of the steering wheel can be the same as that of the steering shaft, and no meshing reversal mechanism need be arranged in a meshing mechanism, thus simplifying the steering apparatus.

Furthermore, since the gear of the steering wheel is internally meshed with the gear of the steering shaft, the pressure angle of teeth is decreased as compared to the conventional external gear type, and noise such as meshing noise can also be reduced.

According to a preferred embodiment of the present invention, operation switches for driving electrical equipments mounted in a vehicle are arranged on the non-rotatable member, and a harness connected to the operation switches is disposed through the gap portion. As a result, layout of the harness required when the operation switches are arranged on the non-rotatable member can be facilitated, and assembly workability of the harness can be improved.

According to another preferred embodiment of the present invention, an air bag is attached on the non-rotatable member, and a unit main body of an air bag unit comprising an expansion mechanism for expanding the air bag is disposed on the vehicle body side member. A coupling pipe for coupling the air bag and the unit main body of the air bag unit is inserted in the gap. As a result, when the air bag unit is arranged, the air bag can be stored in substantially the central portion of the steering wheel in a compact state.

According to still another preferred embodiment, the air bag is attached on the non-rotatable member, and an expansion direction of the air bag is angled downward with respect to a rotational axis of the steering wheel. As a result, since the air bag can be arranged at a predetermined angle regardless of the operation of the steering wheel, the air bag can reliably expand to a driver. This embodiment is particularly effective for a vehicle such as a commercial vehicle or recreation vehicle in which an angle defined between a steering shaft and a horizontal plane is large.

According to still another preferred embodiment, the rotational axis of the ring gear means is arranged to be offset downward from the rotational axis of the pinion means. As a result, since the upward projecting amount of the boss portion of the steering wheel with respect to the steering shaft can be reduced, a space above a steering column can be effectively utilized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

FIGS. 1 to 9 show the first embodiment.

Figure 1:
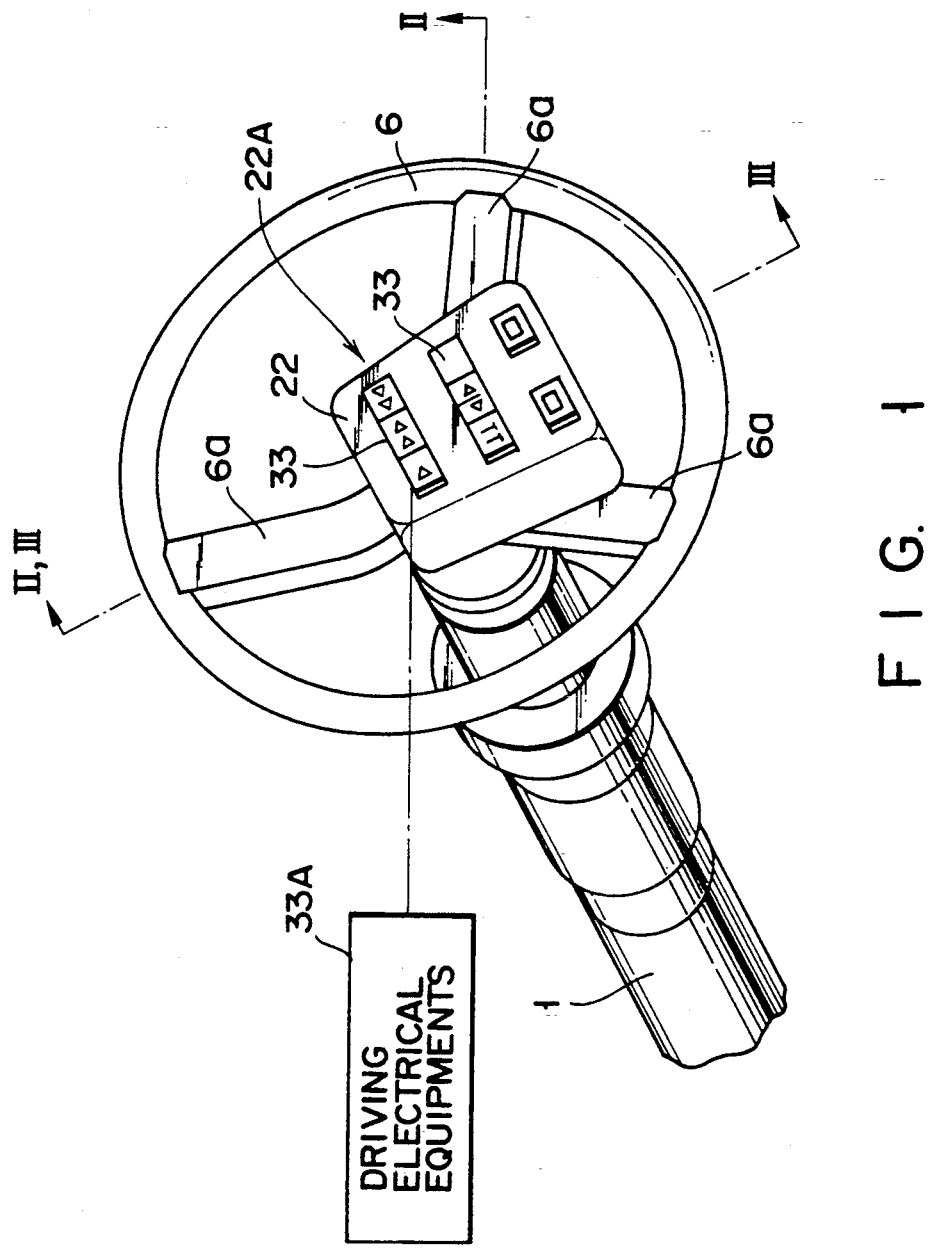
FIG. 1 is a perspective view showing an outer appearance of a steering apparatus according to the first embodiment of the present invention.

FIG. 1 is a perspective view of an outer appearance of a vehicle steering apparatus according to the first embodiment of the present invention. A steering wheel 6 is arranged on the upper end portion of the steering apparatus in the axial direction of a steering column 1. A pad portion 22 as a non-rotatable member 22A is disposed at the center of rotation of the steering wheel 6. Operation switches 33, and the like for driving electrical equipments 33A mounted in a vehicle are arranged on the pad portion 22.

Figure 2:
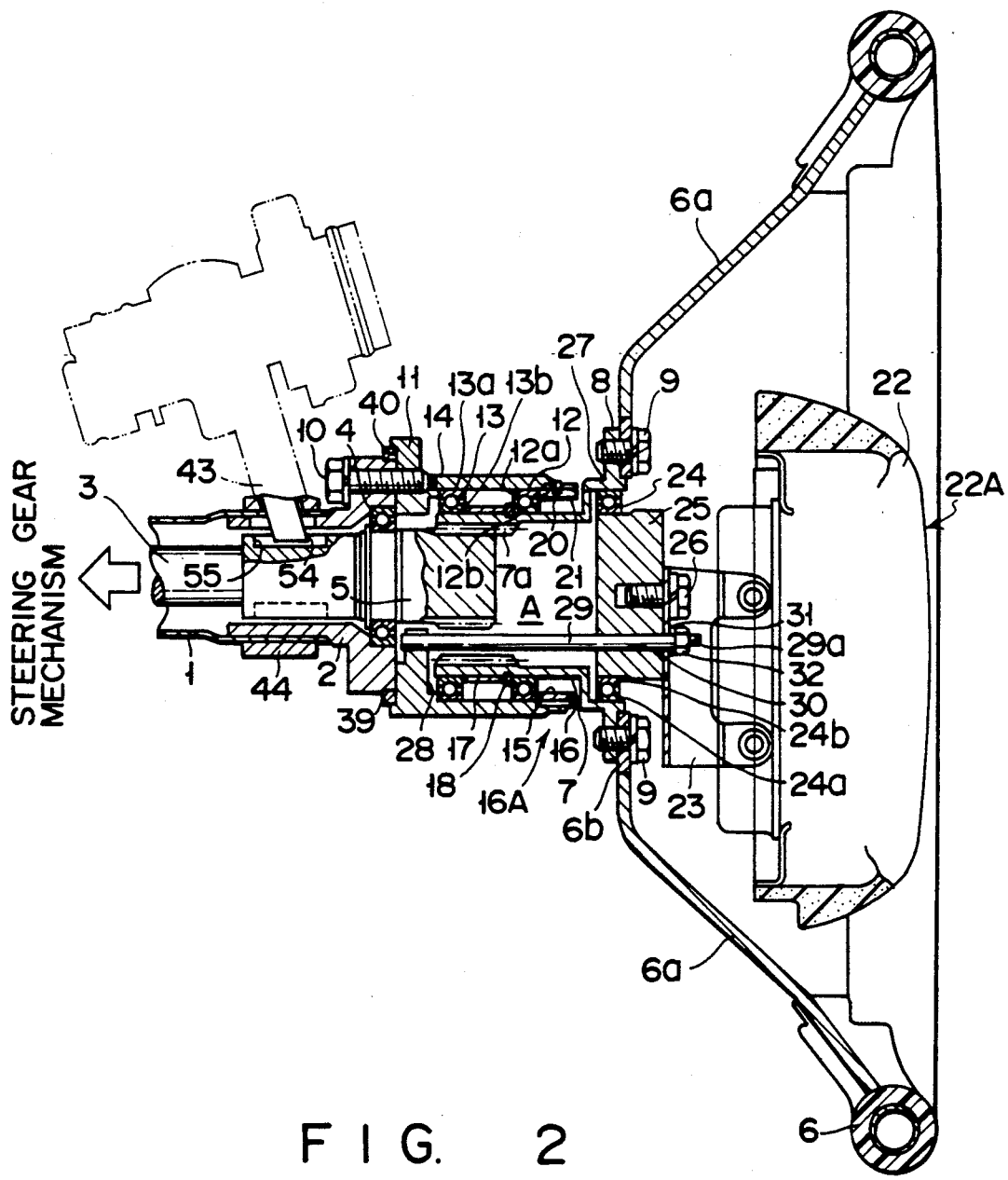
FIG. 2 is a sectional view taken along a line II—II in FIG. 1.

More specifically, one end portion (lower end portion) of a substantially pipe-like column housing 2 is engaged with the upper end portion of the pipe-like steering column 1 mounted on a vehicle body, as shown in FIG. 2.

A steering shaft 3 is inserted in the steering column 1. The upper end portion of the steering shaft 3 is rotatably supported by the other end portion (upper end portion) of the column housing 2 via a ball bearing 4. Furthermore, the lower end portion of the shaft 3 is coupled to a known steering gear mechanism (not shown).

A pinion gear 5 is formed on the upper end portion of the steering shaft 3. The pinion gear 5 is eccentrically meshed with teeth of a ring gear 7a formed on the inner surface of a boss portion 7 of the steering wheel 6.

A coupling flange portion 8 for coupling the steering wheel 6 is formed on the upper end portion of the boss portion 7. The steering wheel 6 has a plurality of inward spokes 6a, as shown in FIG. 1. The inner end portions of these spokes 6a are connected to a substantially ring-like coupling ring 6b. The coupling flange portion 8 of the boss portion 7 and the coupling ring 6b are integrally coupled to each other at a plurality of circumferential positions by a plurality of fixing bolts 9.

Furthermore, the boss portion 7 is rotatably supported, through a pair of upper and lower ball bearings 12 and 13, on the inner surface of a substantially cylindrical gear housing 11 fixed to the upper end portion of the column housing 2. A bearing holding portion 14 which is in contact with the end face of an outer ring 13a of the ball bearing 13 is formed on the end portion, near the column housing 2, of the inner surface of the gear housing 11. Furthermore, a female screw portion 15 is formed on the upper end portion of the inner surface of the gear housing 11. A lock nut 16 for axially pressing an outer ring 12a of the ball bearing 12 is screwed in the female screw portion 15. On the other hand, a snap ring 18 which is in contact with the end face of an inner ring 12b of the bearing 12 is fitted on the outer surface of the boss portion 7. Furthermore, a spacer 17 interposed between the snap ring 18 and an inner ring 13b of the bearing 13 is fitted on the outer surface of the boss portion 7.

More specifically, an adjusting mechanism 16A capable of adjusting an axial distance between the outer rings 12a and 13a of the ball bearings 12 and 13, i.e., the preloads of the bearings 12 and 13 upon threadable engagement of the lock nut 16 can be constituted.

A thin portion 20 is formed on the edge portion of the gear housing 11 on the side of the female screw portion 15. Furthermore, a plurality of circumferentially notched portions 21 are formed in the end portion of the lock nut 16 on the side of the steering wheel 6. Thus, the thin portion 20 of the gear housing 11 is engaged with these notched portions 21 in a collapsed state under pressure while the lock nut 16 is threadably engaged with the female screw portion 15 of the gear housing 11 to a proper fastening position, thus preventing the lock nut 16 from being loosened.

The pad portion 22 disposed at substantially the central portion of the steering wheel 6 is fixed to the side of the gear housing 11 by a method to be described below. That is, a pad mounting bracket 23 is fixed to the bottom surface of the pad portion 22. The pad mounting bracket 23 is fixed to a support member 25 by a bolt 26.

Figure 4:
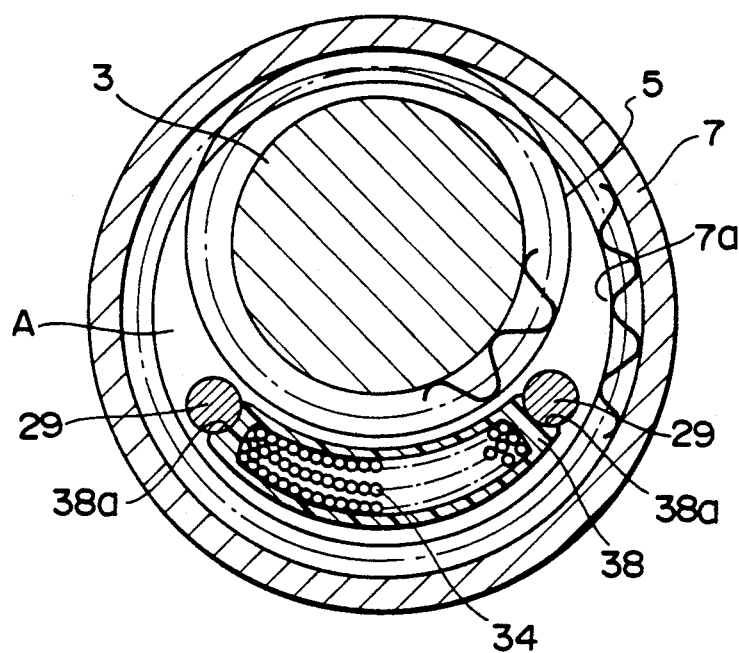
FIG. 4 is a cross-sectional view showing a meshed portion between a ring gear portion of a boss portion and a pinion portion of a steering shaft.
Figure 5:
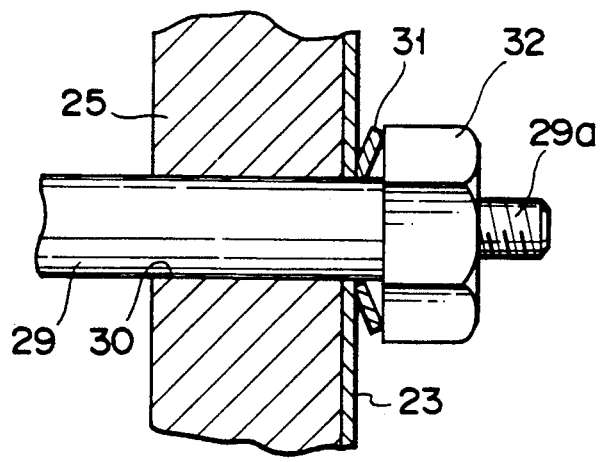
FIG. 5 is an enlarged view of a principal part of a threadably engaged state between a fixing bolt and a fixing nut.

A projection portion 28 which projects toward the pinion gear 5 is formed on the inner surface of the end portion adjacent to the gear housing 11 on the side the column housing 2. The projecting portion 28 opposes a gap portion A between the pinion gear 5 and the ring gear 7a in the axial direction. The gap portion A is defined between the pinion gear 5 and the ring gear 7a since the pinion gear 5 is eccentrically meshed with the ring gear 7a, as described above. A pair of fixing bolts 29 which are separated in the widthwise direction of a vehicle are fitted under pressure in the projecting portion 28, as shown in FIG. 4. The other end of each fixing bolt 29 is fixed to the support member 25 via the gap portion A. More specifically, the other end of each fixing bolt 29 extends through a bolt through hole 30 formed in the support member 25 and the bracket 23, and projects toward the steering wheel 6, as shown in FIG. 5. A small-diameter screw portion 29a is formed on the distal end of the projecting portion of each fixing bolt 29. A fixing nut 32 is threadably engaged with each screw portion 29a. A belleville spring, a wave washer, or an elastic member 31 formed of, e.g., rubber or a synthetic resin are interposed between each fixing nut 32 and the bracket 23. In this embodiment, each fixing nut 32 is threadably engaged with the screw portion 29a formed on the distal end of the corresponding fixing bolt 29. This is to satisfactorily attain positioning and fixing between the fixing nuts 32 and the fixing bolts 29. Therefore, a double nut may be simply used without arranging the small-diameter screw portion 29a.

A large-diameter bearing mounting portion 27 is formed on the boss portion 7 on the side of the coupling flange portion 8. A ball bearing 24 is mounted between the bearing mounting portion 27 and the support member 25. The boss portion 7 is rotatable independently of the support member 25 upon rotation of the steering wheel 6. Outer and inner rings 24a and 24b of the bearing 24 are non-rotatably and non-swingably fitted, respectively, in the bearing mounting portion 27 and the support member 25 under pressure.

Figure 3:
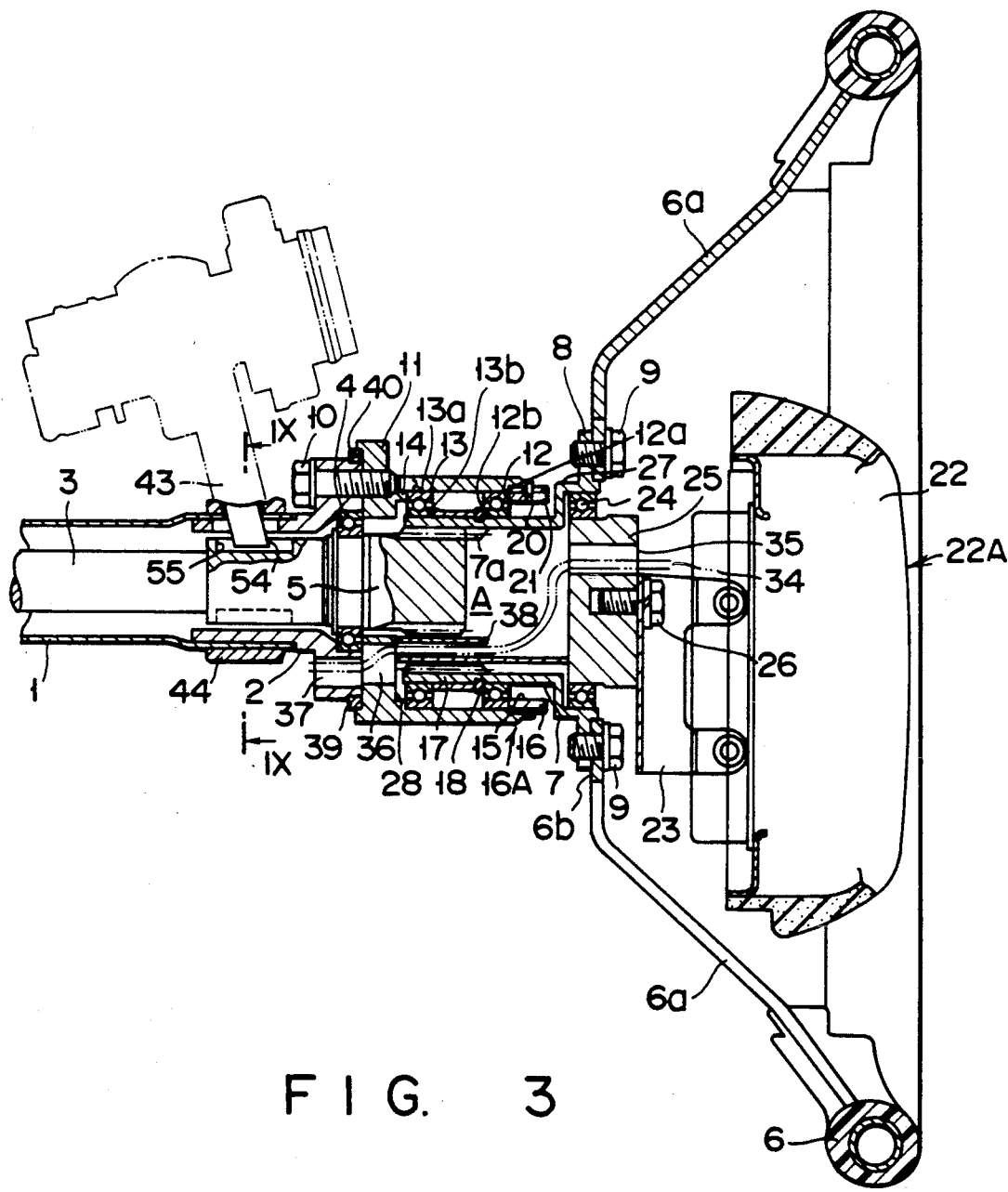
FIG. 3 is a sectional view taken along a line III—III in FIG. 1.

As described above, the operation switches 33, and the like for driving the electrical equipments 33A mounted in the vehicle are arranged on the pad portion 22. For this reason, as shown in FIG. 3, through holes 35, 36, and 37 through which the harness 34 of the respective mounted parts are inserted are formed in the support member 25, the projecting portion 28 of the gear housing 11, and the column housing 2, respectively. Furthermore, a flat cylindrical resin harness guide 38 through which the harness 34 is inserted is disposed between the two fixing bolts 29 in the gap portion A. The harness guide 38 is arranged between the fixing bolts 29 so that its two end portions are engaged with the fixing bolts 29. In this case, the two end portions of the harness guide 38 respectively have engaging portions 38a to be aligned with the bolts 29. Furthermore one end of the harness guide 38 is in contact with the projecting portion 28, and the other end thereof is in contact with the support member 25, as shown in FIG. 3.

That is, the harness guide 38 can prevent the harness 34 excessively swinging in the boss portion 7 to become embedded with the pinion gear 5 or the ring gear 7a.

Figure 7:
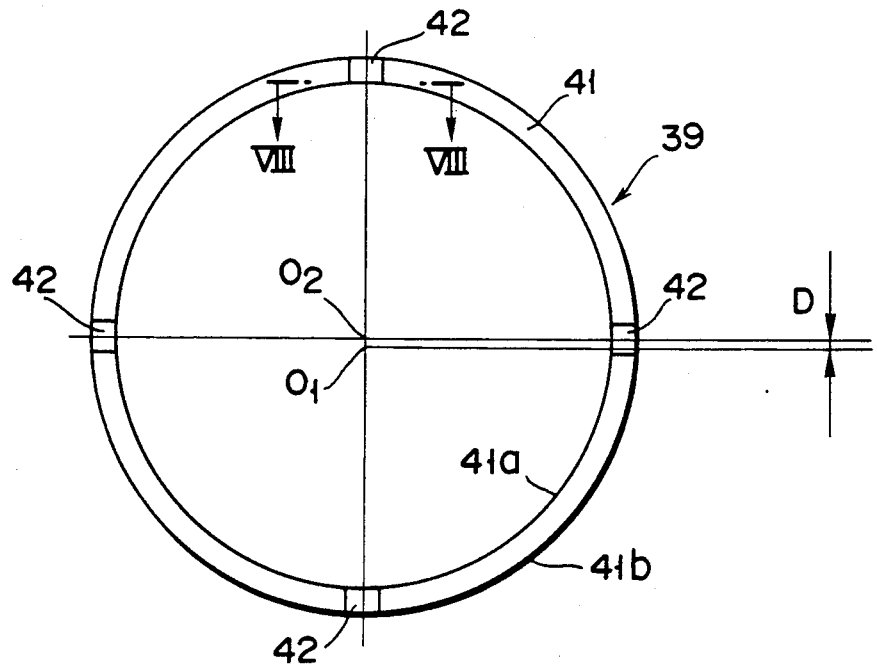
FIG. 7 is a plan view showing an adjust ring.
Figure 8:
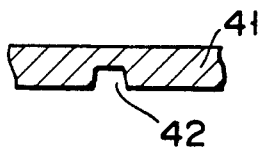
FIG. 8 is a sectional view taken along a line VIII—VIII in FIG. 7.

An adjust ring 39 for adjusting a backlash between the pinion gear 5 and the ring gear 7a is mounted between the column housing 2 and the gear housing 11. More specifically, a recess portion 40 having a circular inner surface is formed on the end portion, joined to the column housing 2, of the gear housing 11. The adjust ring 39 is mounted between the inner surface of the recess portion 40 of the gear housing 11 and the circular outer surface of the column housing 2. In the adjust ring 39, as shown in FIG. 7, an inner surface 41a and an outer surface 41b of a ring body 41 are eccentric with each other. More specifically, a center $O_1$ of the inner surface 41a of the ring body 41 is eccentric from a center $O_2$ of the outer surface 41b by an eccentric distance D. For this reason, the gear housing 11 can be slightly moved in a direction perpendicular to the axial direction relative to the column housing 2 via an insertion portion of the coupling bolt 10 upon rotation of the adjust ring 39. Therefore, upon this relative movement, an offset amount between the axes of the pinion gear 5 and the ring gear 7a can be adjusted, and hence, a backlash between the pinion gear 5 and the ring gear 7a can be adjusted. A plurality of peripheral tool fitting grooves 42 (FIG. 8) are formed in the ring body 41 of the adjust ring 39. Proper tools for selective rotation of the adjust ring 39 can be fitted in these tool fitting grooves 42.

Figure 9:
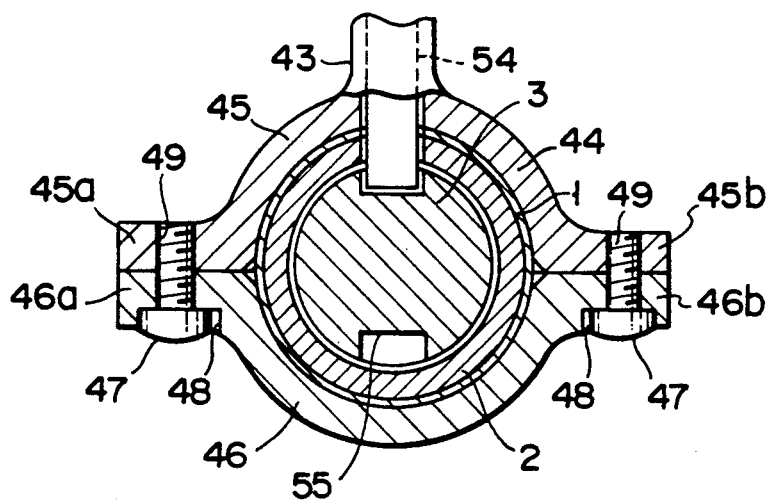
FIG. 9 is a sectional view taken along a line IX—IX in FIG. 3 of a mounting state of a key cylinder unit.

A substantially cylindrical mounting portion 44 of a key cylinder unit 43 is arranged on the outer periphery of the fitting portion between the steering column 1 and the column housing 2. In this case, the mounting portion 44 of the key cylinder unit 43 is constructed of first and second constituting members 45, 46 each having the substantially semi-circular section. And, the first member 45 is formed on the proximal end portion of the key cylinder unit 43, as shown in FIG. 9. Coupling flange portions 45a, 45b, 46a, and 46b are, respectively, formed on the edge portions at two sides of the semi-circular first and second constituting members 45 and 46. Furthermore, through holes for fixing bolts 47, and bolt receiving portions 48 for receiving head portions of the bolts are formed in the coupling flange portions 46a and 46b of the second constituting member 46, and bolt holes 49 which are threadably engaged with these fixing bolts are formed in the flange portions 45a and 45b of the first constituting member 45. In a state wherein a fitting portion of the steering column 1 and the column housing 2 is fitted between the first and second constituting members 45 and 46, the first and second constituting members 45 and 46 are fastened and fixed by the fixing bolts 47. A lock member 54 extending through the steering column 1 and the column housing 2 is formed in the first constituting member 45 of the key cylinder unit 43. The lock member 54 is fitted in a key groove 55 formed in the steering shaft 3. Therefore, the key cylinder unit 43 can be reliably fixed on the steering column 1 side. Note that FIG. 9 illustrates a locked state.

The operation of the first embodiment will be described below.

When the steering wheel 6 is rotated, the boss portion 7 is pivoted together with the steering wheel 6. Upon rotation of the boss portion 7, the steering shaft 3 is rotated in the same direction as that of the steering wheel 6 via the meshed portion between the ring gear 7a formed on the inner surface of the boss portion 7 and the pinion gear 5. For this reason, the rotational force of the steering wheel is transmitted to the steering gear mechanism (not shown) via the steering shaft 3 to turn the vehicle. In this case, since the ring gear 7a formed on the inner surface of the boss portion 7 of the steering wheel 6 side is meshed with the pinion gear 5 on the side of the steering shaft 3, the steering shaft 3 can be rotated in the same direction as the steering wheel 6 when the steering wheel 6 is turned. For this reason, no meshing reversal mechanism need be arranged in the meshing mechanism between the steering wheel 6 side and the steering shaft 3 side. Therefore, the structure of the transmission mechanism for transmitting rotation of the steering wheel 6 to the steering gear mechanism can be simplified as compared to a conventional structure, and cost can be reduced. Since the inner gear meshing mechanism is employed, i.e., since the ring gear 7a and the pinion gear 5 are meshed with each other in the boss portion 7, noise such as meshing noise can be reduced as compared to the conversion external gear type mechanism.

The pad portion 22 located at substantially the central portion of the steering wheel 6 is fixed to the projecting portion 28 of the gear housing 11 via the fixing bolts 29, the support member 25, and the pad mounting bracket 23. Therefore, the pad portion 22 can be kept in a non-rotatable state during rotation of the steering wheel 6. When the operation switches 33 and the like for driving the electrical equipments 33A are arranged on the pad portion 22, as shown in FIG. 1, the harness 34 of these switches 33 can be inserted in the gap portion A which is kept in a non-rotatable state. Therefore, the harness 34 can be easily laid out. Furthermore, the pad portion 22 and the harness 34 can be held in a non-rotatable state during rotation of the steering wheel 6. For this reason, workability of protection, assembly, and the like of the harness 34 can be improved.

Since the boss portion 7 is rotatably supported on the gear housing 11 via the bearings 12 and 13 and is also rotatably supported on the support member 25 via the bearing 24, a support span of the boss portion 7 can be increased. Thus, the steering wheel 6 can be stably supported. In addition, since the elastic members 31 are inserted between the support member 25 and the fixing nuts 32 threadably engaged with the fixing bolts 29, a play of the ball bearing 24 can be eliminated upon an elastic deformation of these elastic members 31, and a proper preload can be applied to the ball bearing 24. For this reason, he steering wheel 6 and the pad portion 22 can be prevented from cluttering, and can be stably supported.

Furthermore, since the adjust ring 39 having the eccentric inner and outer surfaces 41a and 41b is fitted between the column housing 2 and the gear housing 11, the adjust ring 39 can be moved relative to the column housing 2 in a direction perpendicular to the axial direction by pivoting the adjust ring 39. Upon this relative movement, an offset amount between the axes of the pinion gear 5 and the ring gear 7a can be adjusted, and hence, a backlash between the pinion gear 5 and the ring gear 7a can be adjusted. Therefore, the backlash between the pinion gear 5 and the ring gear 7a can be easily managed with high precision.

Figure 6:
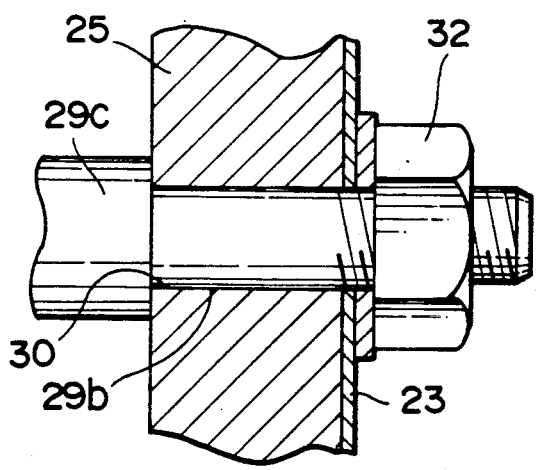
FIG. 6 is an enlarged view of a principal part of modification of the first embodiment.

When the lock nut 16 is rotated to bias the outer ring 12a of the bearing 12, a distance between the outer rings 12a and 13a of the bearings 12 and 13 can be reduced. On the other hand, a distance between the inner ring 13a and 13b of the bearings 12 and 13 is determined by a sum of the length of he spacer 17, and the thickness of the snap ring 18. Therefore, preloads for the two bearings 12 and 13 can be easily adjusted to proper values to prevent cluttering of the steering wheel 6, and the steering wheel 6 can be smoothly and stably pivoted. In the above embodiment, the boss portion 7 is rotatably supported on the gear housing 11 via the bearings 12 and 13 and is also rotatably supported on the support member 25 via the bearing 24. However, if the boss portion 7 can be supported on the gear housing 11 with a sufficient mechanical strength, the bearing 24 can be omitted. On the contrary, if the boss portion 7 can be supported on the support member 25 by only the bearing 24 with a sufficient mechanical strength, the bearings 12 and 13 can be omitted. When the bearing 24 or the bearings 12 and 13 are omitted, it is preferable that portions 29b of the fixing bolts 29 which are inserted in the through holes 30 of the support member 25 are formed to have a small diameter, and the support member 25 is clamped between large-diameter portions 29c of the fixing bolts 29 and the fixing nuts 32, thereby rigidly supporting the support member 25, as shown in FIG. 6

The second embodiment shown in FIGS. 10 to 12 will be described below. The same reference numerals as in the second embodiment denote the common parts in the first embodiment, and a detailed description thereof will be omitted.

Figure 10:
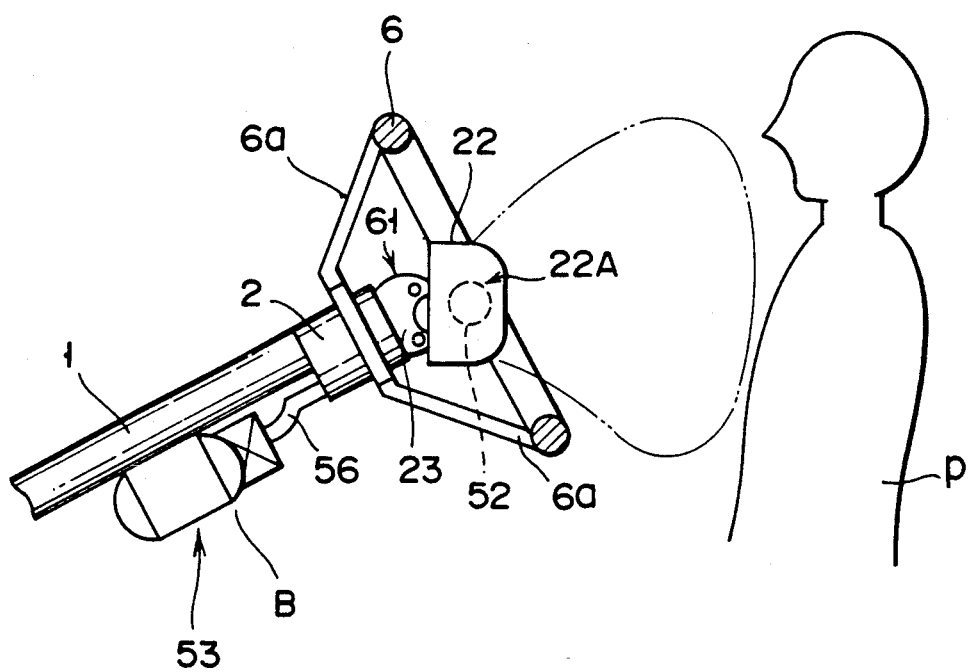
FIG. 10 is a schematic view showing a steering apparatus according to the second embodiment of the present invention.

In the second embodiment, as shown in FIG. 10, an air bag 52 is loaded in a pad unit 22, and a unit main body 53 comprising an expansion mechanism B of the air bag 52 is mounted on a side of steering column 1. A coupling pipe 56 for coupling the air bag 52 and the unit main body 53 is inserted in a gap portion A. For this reason, in an emergency state, an expansion fluid from the unit main body 53 is guided to the air bag 52 via the coupling pipe 56 to expand the air bag 52. Therefore, the air bag 52 can be stored in the pad portion 22 of a steering wheel 6 in a compact state as compared to the conventional structure, and the size of the pad portion 22 can be reduced. For this reason, even when switches 33 are assembled on the pad portion 22, the outer appearance of the steering wheel can be prevented from being impaired.

Figure 11:
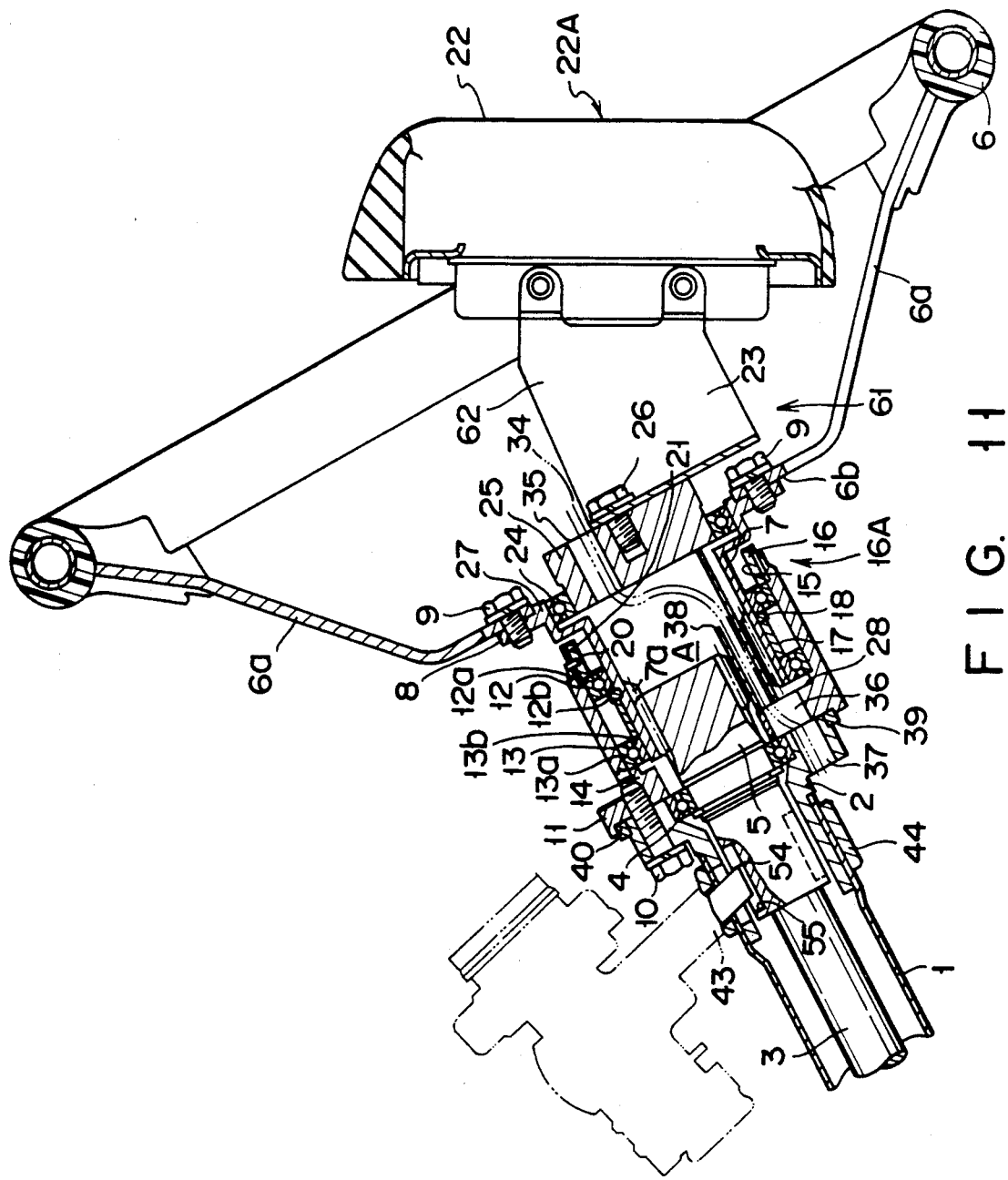
FIG. 11 is a longitudinal sectional view of a principal part of a support mechanism of a pad portion.
Figure 12:
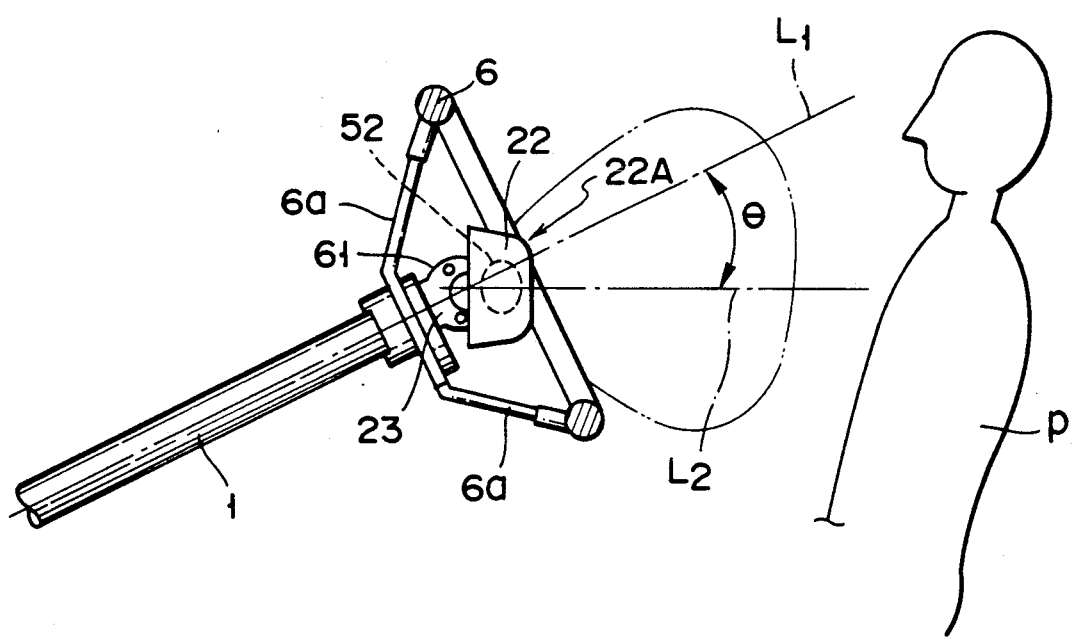
FIG. 12 is a view for explaining the operation of an air bag.

As shown in FIGS. 11 and 12, an expansion direction regulating means 61 for expanding the air bag 52 toward a driver P is arranged in the pad portion 22. A support portion 62 is provided to a pad portion mounting bracket 23 forming the expansion direction regulating means 61. The support portion 62 supports the pad portion 22 so that an axial direction $L_2$ of the front portion of the pad portion 22 is inclined downward at a proper angle $\theta$ with respect to an axis $L_1$ of rotation of the steering wheel 6.

For this reason, the pad portion 22 can be prevented from being rotated in a direction separated from substantially the front portion of the driver P, and can always be held to oppose the driver P. In an emergency state, the air bag 52 can be prevented from expanding in a direction other than a direction of the driver P, and protection performance of the driver P can be improved.

The present invention is not limited to the above embodiments, and various changes and modifications may be made within the spirit and scope of the invention.

What is claimed is:

1. An apparatus for steering a vehicle comprising:
   a steering column assembly, said assembly including a tubular steering column, a column housing having a fitting portion and an upper portion, said fitting portion being mounted within said steering column, and a gear housing, said gear housing being mounted to said upper portion,
   a steering shaft, said steering shaft being mounted for rotation within said assembly, a steering wheel, said steering wheel having an annular boss portion, said annular boss portion having first and second end sections and being rotatably supported by said gear housing, rotation transmission means for transmitting rotation of said steering wheel to said steering shaft, said rotation transmission means including a pinion gear formed at an end portion of said steering shaft, and a ring gear formed on an inner surface of said first end section of said annular boss portion, said ring gear and said pinion gear having respective offset axes of rotation forming a gap between said gears, said pinion gear and said ring gear being operably enmeshed, a non-rotatable member, said member being provided on said steering assembly proximate said steering wheel, and coupling means for coupling said non-rotatable member to said gear housing, said coupling means extending through said gap between said ring gear and said pinion gear, wherein at least said first and second end sections of said annular boss portion are rotatably supported by first and second bearings, respectively, said first bearing being located between the inner circumferential surface of said second end section of said annular boss portion and an outer circumferential surface of said non-rotatable member, and said second bearing being axially isolated from said first bearing and located between the outer circumferential surface of said first end section of said annular boss portion and the inner circumferential surface of said gear housing.

2. The apparatus according to claim 1, further comprising:
operation switches mounted on said non-rotatable member for operating electrical systems of the vehicle; and
a harness inserted in said gap, for connecting said operation switches to said operating electrical systems.

3. The apparatus according to claim 2, further comprising:
a tubular harness guide through which said harness is inserted, and which is inserted in said gap.

4. An apparatus according to claim 1, wherein
said coupling means comprises at least one shaft member, one end of which is fixed to said gear housing; and
nut means fitted on the other end of said shaft member to couple said non-rotatable member to said shaft member.

5. The apparatus according to claim 4, wherein
two sets of shaft members and nut means are arranged to be spaced apart from each other in a width-wise direction of the vehicle.

6. The apparatus according to claim 4, further comprising:
an elastic member, arranged between said nut means and said non-rotatable member, for applying an alignment preload to said first bearing.

7. The apparatus according to claim 1, further comprising:
an air bag which is attached on said non-rotatable member, and which is inflatable in an emergency state.

8. The apparatus according to claim 7, further comprising:

a unit main body mounted on said steering column, said unit main body comprising an expansion mechanism for inflating said air bag; and
a coupling pipe, inserted in said gap, for coupling said air bag and said unit main body.

9. The apparatus according to claim 8, wherein said coupling pipe extends through said gap.

10. The apparatus according to claim 7, wherein
said air bag has a predetermined inflation direction toward the operator of the vehicle.

11. The apparatus according to claim 10, wherein said predetermined inflation direction of said air bag is angled downward with respect to the axis of rotation of said steering wheel.

12. The apparatus according to claim 7, wherein said non-rotatable member includes an air bag compartment within which said air bag is mounted in a non-inflated state.

13. The apparatus according to claim 1, wherein
the axis of rotation of said ring gear is offset below said pinion gear, and said gap is formed below said pinion gear.

14. The apparatus according to claim 1, wherein the axis of said ring gear is co-axial with the axis of said annular boss portion.

15. The apparatus according to claim 1, wherein said first and second bearings are annular bearings having the same diameter, and said annular boss portion is formed in such a manner as to axially align said first and second bearings.

16. An apparatus for steering a vehicle comprising:
a steering column assembly, said assembly including a tubular steering column, a column housing having a fitting portion and an upper portion, said fitting portion being mounted within said steering column, and a gear housing, said gear housing being mounted to said upper portion,
a steering shaft, said steering shaft being mounted for rotation within said assembly,
a steering wheel, said steering wheel having an annular boss portion, said annular boss portion having first and second end sections, an outer surface of said first end section of said annular boss portion of said steering wheel being rotatably supported by said gear housing,
rotation transmission means for transmitting rotation of said steering wheel to said steering shaft, said rotation transmission means including a pinion gear formed at an end portion of said steering shaft, and a ring gear formed on an inner surface of said annular boss portion, said ring gear and said pinion gear having respective offset axes of rotation forming a gap between said gears, said pinion gear and said ring gear being operably enmeshed,
a non-rotatable member, said member being provided on said steering column assembly proximate said steering wheel,
coupling means for coupling said non-rotatable member to said gear housing, said coupling means extending through said gap between said ring gear and said pinion gear, said coupling means comprising at least two shaft members each having one end fixed to said gear housing and the other end coupled to said non-rotatable member,
operation switches mounted on said non-rotatable member, for operating electrical systems of the vehicle;

a harness inserted in said gap, for connecting said operation switches to said electrical systems, and a tubular harness guide through which said harness is inserted, and which is inserted in said gap, said harness guide being arranged between said shaft members and comprises an engaging portion which is engaged with said shaft members to orient said harness guide within said gap.

17. The apparatus according to claim 16, wherein the axis of said ring gear is co-axial with the axis of said annular boss portion.

18. An apparatus for steering a vehicle comprising:
a steering column assembly, said assembly including a tubular steering column, a column housing having a fitting portion and an upper portion, said fitting portion being mounted within said steering column, and a gear housing, said gear housing being mounted to said upper portion, a steering shaft, said steering shaft being mounted for rotation within said assembly, a steering wheel, said steering wheel having an annular boss portion, said annular boss portion having first and second end sections, an outer surface of said first end section of said annular boss portion of said steering wheel being rotatably supported by said gear housing, rotation transmission means for transmitting rotation of said steering wheel to said steering shaft, said rotation transmission means including a pinion gear formed at an end portion of said steering shaft, and a ring gear formed on an inner surface of said annular boss portion, said ring gear and said pinion gear having respective offset axes of rotation forming a gap between said gears, said pinion gear and said ring gear being operably enmeshed, a non-rotatable member, said member being provided on said steering assembly proximate said steering wheel, said non-rotatable member including a support member supported on said gear housing through said coupling means, a pad portion mounting bracket supported on said support member, and a pad portion mounted on said bracket, and coupling means for coupling said non-rotatable member to said gear housing, said coupling means extending through said gap between said ring gear and said pinion gear.

19. The apparatus according to claim 18, wherein the axis of said ring gear is co-axial with the axis of said annular boss portion.

20. An apparatus for steering a vehicle comprising:
a steering column assembly, said assembly including a tubular steering column, a column housing having a fitting portion and an upper portion, said fitting portion being mounted within said steering column, and a gear housing, said gear housing being mounted to said upper portion, a steering shaft, said steering shaft being mounted for rotation within said assembly via a shaft bearing, a steering wheel, said steering wheel having an annular boss portion, said annular boss portion having first and second end sections and being rotatably supported on an outer surface of said first end section by said gear housing, rotation transmission means for transmitting rotation of said steering wheel to said steering shaft, said rotation transmission means including a pinion gear formed at an end portion of said steering shaft, and a ring gear formed on an inner surface of said annular boss portion, said ring gear and said pinion gear having respective offset axes of rotation forming a gap between said gears, said pinion gear and said ring gear being operably enmeshed, a non-rotatable member, said member being provided on said steering assembly proximate said steering wheel, and coupling means for coupling said non-rotatable member to said gear housing, said coupling means extending through said gap between said ring gear and said pinion gear.

21. The apparatus according to claim 20, further comprising:
an adjust ring rotatably interposed in a fitting portion between said gear housing and said column housing, and having eccentric inner and outer surfaces, selective rotation of said adjust ring adjusting the amount of offset between said offset axes of rotation of said pinion gear and said ring gear.

22. The apparatus according to claim 20, further comprising:
a key cylinder unit, said key cylinder unit being fixed to an outer surface of said steering column surrounding said fitting portion, for fastening an outer surface of said fitting portion.

23. The apparatus according to claim 22, wherein said key cylinder unit comprises a mounting portion having a first constituting member formed to have a semi-circular section fitted to said outer surface of said steering column, and formed with coupling flange portions at the semi-circular edge portions, and a second constituting member having the same shape as that of said first constituting member and connected to said first constituting member through said coupling flange portions; and a lock member, said lock member extending through said steering column and said column housing to engage with said steering shaft.

24. The apparatus according to claim 20, wherein the axis of said ring gear is co-axial with the axis of said annular boss portion.

25. An apparatus for steering a vehicle comprising:
a steering column assembly, said assembly including a steering column, a column housing having a fitting portion and an upper portion, said fitting portion being mounted within said steering column, and a gear housing, said gear housing being mounted to said upper portion, a steering shaft, said steering shaft being mounted for rotation within said assembly, a steering wheel, said steering wheel having an annular boss portion, said annular boss portion having first and second end sections, an outer surface of said first end section of said annular boss portion of said steering wheel being rotatably supported by said gear housing, rotation transmission means for transmitting rotation of said steering wheel to said steering shaft, said rotation transmission means including a pinion gear formed at an end portion of said steering shaft, and a ring gear formed on an inner surface of said annular boss portion, said ring gear and said pinion gear having respective offset axes of rotation forming a gap between said gears, said pinion gear and said ring gear being operably enmeshed, a non-rotatable member, said member being provided on said steering assembly proximate said steering wheel, coupling means for coupling said non-rotatable member to said gear housing, said coupling means extending through said gap between said ring gear and said pinion gear, a pair of inboard bearings spaced apart from each other, for rotatably supporting said boss portion on an inner surface of said gear housing, each said inboard bearing including inner and outer rings, and adjusting means arranged on said gear housing to adjust preloads to be applied to said inboard bearings.

26. The apparatus according to claim 25, further comprising:

a spacer, arranged between said inner rings of said inboard bearings, for defining a distance between said inboard bearings; and a lock nut, said lock nut being arranged on said gear housing, to adjust a distance between said outer rings of said inboard bearings.

27. The apparatus according to claim 25, wherein the axis of said ring gear is co-axial with the axis of said annular boss portion.

28. An apparatus for steering a vehicle comprising:

a steering column assembly, said assembly including a tubular steering column, a column housing having a fitting portion and an upper portion, said fitting portion being mounted within said steering column, and a gear housing, said gear housing being mounted to said upper portion, a steering shaft, said steering shaft being mounted for rotation within said assembly, a steering wheel, said steering wheel having an annular boss portion, said annular boss portion having first and second end sections, an outer surface of said first end section of said annular boss portion of said steering wheel being rotatably supported by said gear housing, rotation transmission means for transmitting rotation of said steering wheel to said steering shaft, said rotation transmission means including a pinion gear formed at an end portion of said steering shaft, and a ring gear formed on an inner surface of said annular boss portion, said ring gear and said pinion gear having respective offset axes of rotation forming a gap between said gears, said pinion gear and said ring gear being operably enmeshed, a non-rotatable means for presenting a non-rotating viewable surface to the operator of the vehicle, said means being provided on said steering assembly proximate said steering wheel, and coupling means for coupling said non-rotatable member to said gear housing, said coupling means extending through said gap between said ring gear and said pinion gear.

29. The apparatus according to claim 28, wherein the axis of said ring gear is co-axial with the axis of said annular boss portion.

30. The apparatus according to claim 28, wherein said non-rotatable means includes a member having an obverse face located proximate said steering wheel and viewable by the operator of the vehicle.

* * * * *